United States Patent [19]

Hiraoka et al.

[11] Patent Number: 4,981,515

[45] Date of Patent: Jan. 1, 1991

[54] HIGH FUNCTIONAL REGENERATED CELLULOSE COMPOSITION

[75] Inventors: Keijun Hiraoka; Sunao Morimoto; Itaru Kimura, all of Yatsushiro, Japan

[73] Assignee: Shinkohjinkasei Co., Ltd., Yatsushiro, Japan

[21] Appl. No.: 406,176

[22] Filed: Sep. 12, 1989

Related U.S. Application Data

[63] Continuation of Ser. No. 221,168, Jul. 19, 1988, abandoned.

[30] Foreign Application Priority Data

Apr. 5, 1988 [WO] PCT Int'l Appl. ... PCT/JP88/00343

[51] Int. Cl.$^5$ ............................ C09D 5/16; C08L 1/24
[52] U.S. Cl. ................................ 106/18.12; 106/165; 106/166; 264/189; 264/191
[58] Field of Search .................... 106/165, 166, 18.12; 264/189, 191

[56] References Cited

U.S. PATENT DOCUMENTS

| | | | |
|---|---|---|---|
| 2,234,734 | 3/1941 | Kline | 106/165 |
| 2,839,420 | 6/1958 | Hay | 106/165 |
| 4,210,451 | 7/1980 | Mauric et al. | 106/165 |
| 4,610,905 | 9/1986 | von Blucher et al. | 428/373 |

FOREIGN PATENT DOCUMENTS

| | | |
|---|---|---|
| 48-021774 | 3/1973 | Japan . |
| 61-030609 | 7/1986 | Japan . |
| 63-101439 | 6/1988 | Japan . |

*Primary Examiner*—Theodore Morris
*Attorney, Agent, or Firm*—Armstrong, Nikaido, Marmelstein, Kubovcik & Murray

[57] ABSTRACT

A regenerated cellulose composition having excellent adsorptivity and flame resistance prepared by a process in which viscose, a solvent-adsorbing active carbon in the form of an aqueous dispersion and a specific phosphorus flame retarder are extruded into a coagulation bath to regenerate cellulose which is dried at a temperature not lower than the boiling point of the solvent, whereby the adsorptivity of active carbon is maintained at a high level while a flame resistance is imparted to cellulose.

16 Claims, No Drawings

HIGH FUNCTIONAL REGENERATED CELLULOSE COMPOSITION

This application is a continuation of application Ser. No. 221,168 filed Jul. 19, 1988 now abandoned.

The present invention relates to a regenerated cellulose composition having a high functionality, and more particularly to a high adsorptive, flame retardant regenerated cellulose composition containing active carbon and a process for preparing the same.

A cellulose composition having an adsorptivity is disclosed, for instance, in Japanese Patent Publication Kokai No. 48-21774. The composition is prepared from a mixture of a viscose and active carbon by a process wherein the active carbon which has become inactive owing to adsorption of various substances in the viscose prior to regeneration of cellulose, is activated at a high temperature under vacuum for a long time after the regeneration. Since the composition must be treated for activation after the regeneration of cellulose at a high temperature under vacuum as high as 1 mmHg for a long time, a large energy is consumed, productivity is low, and huge equipment and maintenance cost are required for achieving a high vacuum, thus resulting in large increase in cost of the composition.

Conventional adsorptive cellulose compositions are flammable. Even if they are flame retarded, the flame retardance is not on a sufficiently high level and the compositions are easy to become flammable even by a slight processing. Accordingly, in many cases, the compositions have been used only for restricted purposes. Recently excellent flame retardant materials have been demanded particularly for industrial materials, e.g. filters of air conditioning systems for underground markets or towns and for automobiles, from the viewpoint of prevention of disasters. In order to meet the demand, a regenerated cellulose-based material having adsorptivity and flame retardance has been studied. It is attempted to add active carbon and a phosphorus flame retarder to a viscose in a usual manner and then to regenerate cellulose. The resulting regenerated cellulose composition has an excellent flame retardance, but the adsorptivity is only low due to incorporation of the flame retarder even if subjected to the treatment under high vacuum as mentioned above.

It is an object of the present invention to provide a regenerated cellulose composition of new type having excellent flame retardance as well as excellent adsorptivity.

Another object of the present invention is to provide a process for inexpensively and easily preparing a high functional regenerated cellulose composition having an excellent flame retardance without substantially lowering the adsorption activity of active carbon incorporated therein.

These and other objects of the present invention will become apparent from the description hereinafter.

It has been found that a flame retardance can be imparted to a regenerated cellulose composition containing active carbon with maintaining the adsorption activity of active carbon at a high level of not less than 50% of the adsorption activity of active carbon in the air by adding to a viscose an active carbon powder into which a solvent having a boiling point of not more than 260° C. has been previously adsorbed, and a flame retarder selected from phosphorus compounds inactive to viscose or sodium hydroxide and insoluble in water and an acid, coagulating the resulting mixture in a coagulation bath to regenerate cellulose, and drying it at a temperature of not lower than the boiling point of the adsorbed solvent.

In accordance with the present invention, there is provided a functional regenerated cellulose composition comprising 100 parts by weight of a matrix composed of regenerated cellulose, 3 to 300 parts by weight of active carbon particles, and 1 to 100 parts by weight of at least one flame retarder selected from phosphorus compounds inactive to viscose or sodium hydroxide and insoluble in water and an acid, the adsorption activity of said active carbon being not less than 50% of the adsorption activity in the air.

Any viscoses can be used in the present invention so long as cellulose can be regenerated in a coagulation bath. For example, there is exemplified a usual viscose having a composition adopted for the production of rayon and cellophane such that the content of cellulose is from 5 to 15% by weight and the content of sodium hydroxide is from 2.5 to 10% by weight.

When viscose is extruded into a coagulation bath, cellulose xanthate (cellulose xanthogenate) in the viscose is converted into cellulose by $H_2SO_4$ present in the coagulation bath. The surface layer is first formed, and subsequently dehydration of viscose and regeneration occur through the surface layer. At that time, $CS_2$ and $H_2SO_4$, and the release of them with water through the surface layer produces numerous pores, thus the resulting regenerated cellulose composition has pores communicating directly with active carbon incorporated therein. Accordingly, it is important for the invention to use regenerated cellulose as a matrix.

Commercially available active carbons are used in the present invention, which may be finely divided as occasion demands. In order to obtain the adsorptive composition having a high adsorptivity, active carbon having a specific surface area of not less than 300 $m^2/g$, preferably not less than 1,000 $m^2/g$, is usually used. Also, when the composition of the present invention is formed into thin fibrous materials having a size as thin as 1.5 to 2.0 deniers, or into sheet materials having a thickness as thin as about 20 $\mu m$, active carbon having an average particle size of not more than 2 $\mu m$ is preferred, since the use of active carbon having a larger particle size may cause troubles such as breakage upon forming into fibrous or sheet materials.

Active carbon is made to adsorb a solvent before adding to a viscose. The solvent-adsorbing active carbon is used usually in the form of an aqueous dispersion in view of easiness in uniformly dispersing into the viscose. An aqueous dispersion of active carbon having an average particle size of not more than 2 $\mu m$ is obtained, for instance, by adding a solvent having a boiling point of not more than 260° C. and capable of being adsorbed by active carbon to a commercially available active carbon having a particle size of 10 to 100 $\mu m$, admixing the solvent-adsorbing active carbon with water, optionally adding a dispersant if desired, and placing the resulting dispersion in a wet pulverizer containing glass or ceramic beads having a diameter of about 1 mm, e.g. a sand grinder made by Igarashi Kikai Seisakusho, and operating the pulverizer for several hours to thereby pulverize the active carbon.

Active carbon fine particles are previously treated with a liquid compound having a boiling point of not more than 260° C. and capable of being adsorbed by active carbon. Compounds generally used as solvents in the industrial fields can be used as the liquid compound in the present invention. Representative examples of the solvent are, for instance, an alcohol such as methanol, ethanol, propanol, isopropanol, buthanol or amyl alcohol; an aromatic hydrocarbon such as benzene, toluene or monochlorobenzene; an ether such as diethyl ether or tetrahydrofuran; an aliphatic or alicyclic hydrocarbon such as methane, ethane, propane or cyclohexane; a ketone such as acetone or methyl ethyl ketone; an aldehyde such as formaldehyde or acetoaldehyde; an organic acid such as formic acid or acetic acid; a halohydrocarbon such as carbon tetrachloride or trichloroethylene; other organic solvents such as carbondisulfide, dimethylformamide or dimethylsulfoxide; and the like. The treatment of active carbon is conducted, for instance, by adding a solvent to active carbon, and allowing to stand for at least about 10 minutes. The amount of the solvent to be adsorbed by active carbon is from 10 to 1,000% by weight, preferably 50 to 300% by weight, based on active carbon. The treated active carbon is admixed with water to give a dispersion having an active carbon content of 5 to 80% by weight. The use of a solvent having a boiling point of more than 260° C. should be avoided, since drying of cellulose after regeneration at a temperature of more than 260° C. to remove water and the solvent results in carbonization of cellulose.

Anionic, cationic, non-ionic and amphoteric surfactants may be used as dispersants if desired, in order to raise the dispersibility of active carbon. The surfactants may be used alone or as a mixture thereof excepting a mixture of an anionic surfactant and a cationic surfactant.

The amount of the active carbon to be incorporated in the composition is from 3 to 300% by weight based on the matrix (cellulose). When the amount is less than 3% by weight, the adsorptivity of the obtained composition is low, thus poor in practicability. Also, when the amount is more than 300% by weight, the obtained composition is poor in strength, thus it is easy to be broken and is not suited for practical use. Also, when it is desired to prepare the composition as thin fibrous materials or thin sheet materials, it is preferable to use the active carbon in an amount of not more than 200% by weight based on the matrix in view of the stability in forming into fibrous or sheet materials. When the amount is more than 200% by weight, the composition is easy to break during the operation.

Preferably, the flame retarders used in the present invention are phosphorus compounds inactive to viscose and sodium hydroxide and insoluble in water and an acid, e.g. mineral acids used for the coagulation bath such as sulfuric acid. Representative examples of the flame retarder used in the present invention are, for instance, phosphazene derivatives of the formula (1):

(1)

wherein R and $R^1$ are the same or different and each is a substituted or unsubstituted group having 1 to 12 carbon atoms such as alkyl group, alkenyl group, phenyl group, phenylalkyl group or alkylphenyl group, or hydrogen atom, and n is an integer of 3 or more; phosphonitrile derivatives of the formula (2):

(2)

wherein X and Y are the same or different and each is a halogen atom such as Cl, Br, I or F, or an amino group of the formula: $NR^2R^3$ in which $R^2$ and $R^3$ are the same or different and each is a substituted or unsubstituted group having 1 to 12 carbon atoms such as alkyl group, alkenyl group, phenyl group, phenylalkyl group or alkylphenyl group, and n is an integer of 3 or more; and triphenylphosphates of the formula (3):

(3)

wherein Ph is phenyl group, and Z is a substituted or unsubstituted alkyl or alkenyl group having 1 to 12 carbon atoms, a halogen atom, amino group, hydroxyl group or hydrogen atom. The flame retarders may be used alone or as a mixture thereof.

The flame retarder is used in an amount of 1 to 100% by weight based on the matrix (cellulose). Preferably, the flame retarder is used in an amount of not less than 5% by weight to less than 30% by weight based on the matrix, since when the amount is less than 5% by weight, the flame retarding effect is not sufficient, and since when the amount is not less than 30 % by weight, the obtained composition has no sufficient strength and is easy to break, and also in case of forming into fibrous materials, the opening procedure is unstable.

One or more kinds of substances capable of generating a gas by reaction with an acid may be added to the viscose in an amount of 5 to 150% weight based on the cellulose in the viscose in order to more completely prevent the deactivation in adsorptivity of active carbon, or in order to increase the number of effective active carbon particles incorporated in the cellulose matrix. For instance, metal salts such as carbonates, hydrogencarbonates, sulfites and hydrogensulfites of sodium, potassium, calcium and magnesium, and metal sulfides such as sodium, potassium, calcium and magnesium sulfides are used as such a gas-releaseable substance. Representative examples of such substances are, for instance, sodium hydrogencarbonate, potassium carbonate, calcium carbonate, magnesium carbonate, sodium sulfide, sodium hydrosulfide, sodium sulfite, sodium hydrogensulfite, and the like. These substances may be used alone or as a mixture thereof. When these substances are added to the viscose, the regeneration of cellulose must be conducted immediately. A larger number of pores can be more completely introduced into the cellulose matrix by using these substances, since a gas is generated by the reaction between the acid in the coagulation bath and the above-mentioned salt or sulfide and it goes out through the matrix to form pores in the matrix. Since substances to be adsorbed by active carbon diffuse to the active carbon particles through the pores of the matrix and reach the pores of active carbon without being hindered by the matrix, there can be more surely obtained a functional regenerated cellulose composition having an adsorption activity close to that of active carbon itself. The coagulation of viscose is accelerated by addition of the above gas-releasable substance such as sodium carbonate, thus causing lowering of the degree of ripening. Accordingly, it is essential to conduct the regeneration immediately after mixing the gas-releasable substance with the viscose, preferably within 5 minutes.

The composition of the present invention may contain other additives, as occasion demands, e.g. antistatic agent, X-ray shielding agent, ion exchange material, chelate-forming material, zeolite, other adsorbents, enzyme, and catalyst.

A usual coagulation bath used for the production of regenerated cellulose can be used in the present invention for coagulating the viscose to which the predetermined additives are added. Usually the coagulation bath contains 40 to 200 g/liter of sulfuric acid and 150 to 380 g/liter of sodium sulfate as main components, and optionally 10 to 30 g/liter of zinc sulfate. The coagulation bath is usually maintained at a temperature of 40° to 50° C.

The method for preparing the regenerated cellulose composition of the present invention will be explained below. The viscose is admixed with predetermined amounts of solvent-adsorbing active carbon particles, flame retarder, and optionally other additives and an aqueous solution of the gas-releasable substance such as a metal salt or a metal sulfide. The resulting mixture is extruded from a nozzle having an appropriate shape into the coagulation bath, thereby regenerating cellulose. In the case of producing a thin fibrous material or a thin sheet material and in the case where an aqueous solution of a metal salt has been added to the viscose, it is preferable to subject the mixture to the coagulation-regeneration operation within 5 minutes in view of the stability of the coagulation-regeneration step. In the coagulation-regeneration step, the drawing treatment may be conducted according to a known method, whereby the physical properties of the obtained composition in the fiber or sheet form are raised. The regenerated cellulose composition is then subjected to scouring, e.g. washing with water, according to a known method and is dried with heat. Since the active carbon is pretreated to adsorb a solvent before dispersing into water, it is necessary to conduct the drying at a temperature which is higher than the boiling point of the solvent and at which the solvent can be desorbed. When the drying temperature is lower than the boiling point of the solvent, the solvent desorbed by heating or the like remains in the pores of active carbon. On the other hand, when the drying temperature is over the boiling point, the solvent vaporizes to go out from the pores. Moreover, the volume expands as a result of changing into gas and, therefore, even if foreign materials are present in the pores of active carbon, they are forced out by the gas to completely renew the pores of active carbon, thus the activation of active carbon can be highly achieved.

The shape of the composition obtained according to the present invention is not particularly limited. For instance, the composition may be in the form of fiber, film, sheet, plate, mass, sponge, or the like.

The functional regenerated cellulose composition of the present invention has excellent physical properties and processability in itself. The fiber-like composition of the invention which may be treated with an oiling agent or may be cut into a desired length, can be processed into cotton-like product, filament or yarn, paper-like product, nonwoven fabric, or a combination thereof. The fiber-like composition of the invention can also be used in combination with other fibers or film materials to produce blended yarn or fabric, union fabric, paper-like product, laminate, and the like. The composition of the invention can be processed to all forms considered as fiber, and in cooperation with its excellent flame resistance and adsorptivity, physical properties and low cost, it can be used for various purposes, e.g. various air filters, dust mask, purification of electrolyte, deodorization, decolorizing device, ultra pure water producing device, clothes, bedding, various sanitary fixtures, support for catalysts and enzymes, moving bed type adsorber, antitoxic or bacteria-proof clothes, and material for freshness retention. Also, the sheet-like composition of the present invention may be coated with a softening agent, a slipping agent or other coating materials, and may be cut to a desired size, as occasion demands. It can be laminated with other film materials. The sheet-like composition of the invention can be used for various purposes, in cooperation with its excellent flame resistance and adsorptivity, physical properties and low cost, e.g. separation of electrolyte, chromatography, molecular sieve, deodorant, decolorizer, various sanitary fixtures, support for catalysts and enzymes, moving fed type adsorber, and antitoxic or bacteria-proof materials. The composition formed into other shapes also has excellent physical properties and processability and can be used for various purposes, for instance, in the form of sponge.

The present invention is more specifically described and explained by means of the following Examples in which all percents are % by weight unless otherwise noted. It is to be understood that the present invention is not limited to these Examples.

In the Examples, the adsorptivity was measured by the following method according to JIS K 1474 ($I_2$ adsorption method): In a brown conical flask with ground stopper was placed 0.5 to 1.0 g of a sample, and 50 ml of a 0.1N iodine solution was added to the flask. It was shaken by a shaker for 15 minutes. The mixture was then subjected to centrifugation at 3,000 r.p.m. for 10 minutes, and 10 ml of the supernatant was taken out and placed in another conical flask and was titrated with 0.1N sodium thiosulfate using starch as an indicator. The $I_2$ adsorption (mg/g) was calculated according to the following equation.

$$I_2 \text{ adsorption (mg/g)} = \frac{0.1 \times f \times (a - b) \times 12.69 \times 5}{w}$$

w: Weight of sample (g)
f: Factor
a: Volume of 0.1N iodine solution (ml)
b: Volume of 0.1N sodium thiosulfate (ml)

Also, the adsorptivity retention percentage was calculated according to the following equation.

$$\text{Adsorptivity retention (\%)} = \frac{I^1 - I^0(1 - AC \text{ addition ratio})}{I^2 \times AC \text{ addition ratio}}$$

$I^1$: Amount of iodine adsorbed by sample (composition of the invention)
$I^0$: Amount of iodine adsorbed in blank test by a regenerated cellulose composition prepared without adding active carbon
$I^2$: Amount of iodine adsorbed by active carbon AC addition ratio: Weight ratio of active carbon (AC) to total weight of AC and cellulose, namely AC/(AC+cellulose)

EXAMPLE 1

To active carbon having a specific surface area of 1,250 m$^2$/g was added methanol in an amount of 200% of active carbon. After allowing to stand for 1 hour, it was placed in a wet pulverizer (sand grinder) with water and pulverized to about 0.5 μm in average particle size, whereby a 20% aqueous dispersion of active carbon was obtained.

The aqueous dispersion and hexapropoxy-phosphazene as a flame retarder were continuously injected to a viscose containing 8.8% of cellulose and 5.7% of an alkali by a constant flow pump so that predetermined amounts of active carbon and flame retarder based on cellulose were added. The mixture was mixed by a flash mixer and immediately extruded through a nozzle having 3,000 holes each having a diameter of 0.1 mm into a spinning bath of 45° C. containing 112 g/liter of H$_2$SO$_4$, 360 g/liter of Na$_2$SO$_4$ and 15 g/liter of ZnSO$_4$. The filaments were then drawn 140% in the air, led to a bath of 85° C. containing 20 g/liter of H$_2$SO$_4$, cut to the predetermined length, purified in a usual manner, and dried at 120° C. to give a rayon (5 deniers, 51 mm) containing 50% of active carbon and 20% of hexapropoxyphosphazene flame retarder based on cellulose (Example 1-2). The obtained rayon fiber was subjected to carding and a nonwoven fabric was prepared.

As a sample for blank test, a rayon staple fiber was prepared in the same manner as above except that active carbon and the flame retarder were not used.

The above procedure was repeated except that the flame retarder and active carbon were added to the viscose so that the product contained, based on cellulose, 20% of the flame retarder and 33% of active carbon (Example 1—1), 20% of the flame retarder and 100% of active carbon (Example 1—3), 50% of active carbon and 5% of the flame retarder (Example 1-4), or 50% of active carbon and 80% of the flame retarder (Example 1-5).

The results are shown in Table 1.

EXAMPLE 2

A flame retardant rayon fiber was prepared in the same manner as in Example 1 except that the active carbon in the form of the dispersion and hexaisopropoxyphosphazene flame retarder were added batchwise to the viscose in amounts of 50% and 20%, respectively, based on cellulose, stirred for 2 hours and spun.

The results are shown in Table 1.

EXAMPLE 3

A rayon containing 50% of active carbon and 20% of tricresyl phosphate based on cellulose was prepared in the same manner as in Example 1 except that tricresyl phosphate was used as the flame retarder and a 30% aqueous solution of sodium carbonate was further added continuously to the viscose so that the amount of sodium carbonate was 50% of cellulose.

The results are shown in Table 1.

It is observed in Table 1 that the adsorptivity of the rayon is further improved.

Comparative Example 1

A 10% aqueous solution of sodium hydroxide was added to a commercially available active carbon powder in an amount of 50% based on active carbon to give an aqueous suspension. The suspension was added to the same viscose as used in Example 1 so that the amount of active carbon was 50% of cellulose. Propoxyphosphazene was further added as the flame retarder to the viscose in an amount of 5%, 20% or 80% based on cellulose. After stirring for 2 hours, each of the mixtures was spun in a coagulation bath through a nozzle having 1,200 holes each having a diameter of 0.15 mm to give a rayon having a size of 15 d×51 mm.

The rayon fibers were then dried at 100° C. and 1 mmHg for 10 hours to give test samples (Com. Ex. 1—1, Com. Ex. 1-2 and Com. Ex. 1-3). Separately the rayon fibers were purified and dried under the same conditions as in Example 1 to give test samples (Com. Ex. 1-4, Com. Ex. 1-5 and Com. Ex. 1-6).

The results are shown in Table 1.

EXAMPLE 4

To active carbon having a specific surface area of 1,550 m$^2$/g was added 200% of methanol based on active carbon. The active carbon was then pulverized to about 0.5 μm in average particle size and dispersed in water to give a 20% aqueous suspension of active carbon.

The aqueous suspension and hexapropoxyphosphazene flame retarder were continuously added to a viscose containing 8.8% of cellulose and 5.7% of an alkali by a constant flow pump so that the amount of active carbon was 33%, 50% or 100% of cellulose and the amount of the flame retarder was 20% of cellulose. Each of the mixtures was mixed by a flash mixer, immediately extruded through a slit having a clearance of 200 μm and a width of 2,150 mm into a coagulation bath containing 130 g/liter of H$_2$SO$_4$ and 200 g/liter of Na$_2$SO$_4$ and maintained at 45° C., and purified in a usual manner to give a cellophane having a basis weight of 45 g/m$^2$ and a width of 1,250 mm.

The properties of the cellophane were measured. It had excellent adsorptivity and physical properties.

The results are shown in Table 2.

EXAMPLE 5

A cellophane was prepared in the same manner as in Example 4 except that the active carbon in the form of the suspension and the flame retarder were added batchwise to the viscose in amounts of 50% and 20%, respectively, based on cellulose, stirred for 2 hours, formed into a film and purified.

The results are shown in Table 2.

From the results shown in Tables 1 and 2, it would be apparent that the regenerated cellulose compositions prepared according to the present invention have excellent adsorptivity and flame retardance, and that according to the present invention, it is possible to achieve an adsorption activity retention of 95% or more and a limited oxygen index (LOI) of 25 or more (flame resistance shown by minimum oxygen concentration necessary to keep burning).

Since the composition of the present invention is excellent in both of the adsorption activity and flame resistance, it is suitable as industrial materials in the fields requiring a high flame resistance, e.g. filter of air conditioners used in underground town and multistory building, and air conditioner for automobiles.

In addition to the ingredients used in the Examples, other ingredients can be used in the Examples as set forth in the specification to obtain substantially the same results.

TABLE 1

| | Active carbon (%)* | I₂ adsorption (mg/g) | I₂ adsorption (mg/g AC) | Adsorptivity retention (%) | Strength (g/d) | Elongation (%) | LOI |
|---|---|---|---|---|---|---|---|
| Blank | 0 | 72 | — | — | 2.20 | 19.7 | 18 |
| Active carbon | 100 | 638 | 638 | 100 | — | — | 18 |
| Ex. 1-1 | 33 | 196 | 567 | 89 | 1.00 | 26.2 | 28 |
| Ex. 1-2 | 50 | 247 | 602 | 94 | 0.81 | 33.3 | 29 |
| Ex. 1-3 | 100 | 324 | 576 | 90 | 0.49 | 30.9 | 30 |
| Ex. 1-4 | 50 | 248 | 606 | 95 | 0.83 | 33.9 | 20 |
| Ex. 1-5 | 50 | 212 | 498 | 78 | 0.73 | 28.0 | 31 |
| Ex. 2 | 50 | 225 | 531 | 83 | 0.78 | 31.8 | 29 |
| Ex. 3 | 50 | 252 | 619 | 97 | 0.67 | 21.6 | 29 |
| Com. Ex. 1-1 | 50 | 151 | 313 | 49 | 0.79 | 18.8 | 19 |
| Com. Ex. 1-2 | 50 | 149 | 306 | 48 | 0.78 | 19.8 | 29 |
| Com. Ex. 1-3 | 50 | 143 | 287 | 45 | 0.74 | 18.0 | 30 |
| Com. Ex. 1-4 | 50 | 111 | 191 | 30 | 0.77 | 18.6 | 20 |
| Com. Ex. 1-5 | 50 | 107 | 179 | 28 | 0.73 | 17.5 | 29 |
| Com. Ex. 1-6 | 50 | 103 | 166 | 26 | 0.70 | 17.2 | 30 |

(Note) *% based on cellulose

TABLE 2

| | Active carbon (%)* | I₂ adsorption (mg/g) | I₂ adsorption (mg/g AC) | Adsorptivity retention (%) | Strength (MD/TD) (kg/15 mm) | Elongation (MD/TD) (%) | LOI |
|---|---|---|---|---|---|---|---|
| Blank | 0 | 41 | — | — | 4.0/2.4 | 26/58 | 18 |
| Active carbon | 100 | 839 | 839 | 100 | — | — | 18 |
| Ex. 4-1 | 33 | 160 | 517 | 62 | 3.6/2.4 | 14/13 | 26 |
| Ex. 4-2 | 50 | 196 | 511 | 61 | 3.0/2.4 | 12/11 | 27 |
| Ex. 4-3 | 100 | 280 | 519 | 62 | 2.7/2.3 | 9/6 | 28 |
| Ex. 5 | 50 | 188 | 487 | 58 | 2.9/2.2 | 11/10 | 27 |

(Note) *% based on cellulose

What we claim is:

1. A functional regenerated cellulose composition comprising 100 parts by weight of a matrix composed of regenerated cellulose, 3 to 300 parts by weight of active carbon particles, and 5 to 100 parts by weight of at least one flame retarder selected from the group consisting of phosphorous compounds inactive to viscose or sodium hydroxide and insoluble in water and an acid, the adsorption activity of said active carbon in said functional regenerated cellulose being not less than 58% of the adsorption activity of the active carbon in air prior to being incorporated into said functional regenerated cellulose composition.

2. The composition of claim 1, wherein said flame retarder is at least one member selected from the group consisting of phosphazene derivatives, phosphonitrile derivatives and triphenylphosphates.

3. The composition of claim 1, wherein said active carbon has an average particle size of not more than 2 μm.

4. The composition of claim 1 which is in the form of fiber, film or sheet.

5. A process for preparing a functional regenerated cellulose composition which comprises adding 3 to 300% by weight of an active carbon powder in which is adsorbed a solvent having a boiling point of not more than 260° C. and capable of being adsorbed by active carbon, and 1 to 100% by weight of at least one flame retarder selected from phosphorous compounds inactive to viscose or sodium hydroxide and insoluble in water and an acid to a viscose containing 5 to 15% by weight of cellulose and 2.5 to 10% by weight of sodium hydroxide, coagulating the resulting mixture in a coagulation bath containing 40 to 200 g/liter of sulfuric acid and 150 to 380 g/liter of sodium sulfate to regenerate cellulose, and drying the regenerated cellulose at a temperature not lower than the boiling point of said solvent, said % of the active carbon powder and the flame retarder being % by weight based on the cellulose.

6. The process of claim 5, wherein said active carbon powder is pulverized to be not more than 2 μm in average particle size after adsorbing the solvent and is admixed with the viscose by a flash mixer, and the viscose is extruded within 5 minutes into the coagulation bath in the form of a filament or a film.

7. The process of claim 5, wherein 5 to 150% by weight of, based on the cellulose, at least one metal compound selected from the group consisting of carbonates, hydrogencarbonates, sulfites, hydrogensulfites and sulfides of sodium, potassium, calcium and magnesium is added in the form of an aqueous solution to the viscose just before the coagulation of the viscose.

8. The process of claim 5, wherein the amount of the adsorbed solvent is 10 to 1,000% by weight based on the active carbon powder.

9. A functional regenerated cellulose composition comprising 100 parts by weight of a matrix composed of regenerated cellulose, 3 to 300 parts by weight of activated carbon particles, and 1 to 100 parts by weight of at least one flame retarder selected from the group consisting of phosphorous compounds inactive to viscose or sodium hydroxide and insoluble in water and an acid, the adsorption activity of said activated carbon in said functional regenerated cellulose being not less than 78% of the adsorption activity of the activated carbon in air prior to being incorporated into said functional regenerated cellulose composition.

10. The composition of claim 1, wherein the flame retarder is present in an amount of 5 to 30 parts by weight per 100 parts by weight of the matrix.

11. A functional regenerated cellulose composition comprising 100 parts by weight of a matrix composed of regenerated cellulose, 3 to 300 parts by weight of active carbon particles, and 1 to 100 parts by weight of at least one flame retarder selected from the group consisting of phosphorous compounds inactive to viscose or sodium hydroxide and insoluble in water and an acid, wherein said regenerated cellulose composition is prepared by a process which comprises the steps of adding to viscose (1) active carbon particles in which is adsorbed a solvent having a boiling point of not more than 260° C. and (2) said flame retarder, regenerating cellulose from the viscose, and drying the regenerated cellulose at a temperature not lower than the boiling point of said solvent, whereby the adsorption activity of said active carbon in said functional regenerated cellulose is not less than 50% of the adsorption activity of the active carbon in air prior to being incorporated into the functional regenerated cellulose composition.

12. The composition of claim 11, wherein said flame retarder is at least one member selected from the group consisting of phosphazene derivatives, phosphonitrile derivatives and triphenylphosphates.

13. The composition of claim 11, wherein said active carbon has an average particle size of not more than 2 μm.

14. The composition of claim 11, which is in the form of fiber, film or sheet.

15. The composition of claim 11, wherein the flame retarder is present in an amount of 5 to 100 parts by weight per 100 parts by weight of the matrix.

16. The composition of claim 11, wherein the flame retarder is present in an amount of 5 to 30 parts by weight per 100 parts by weight of the matrix.

* * * * *